US009777149B2

(12) United States Patent
Takeda et al.

(10) Patent No.: US 9,777,149 B2
(45) Date of Patent: Oct. 3, 2017

(54) POLYESTER RESIN COMPOSITION, ADHESIVE AND FILM

(71) Applicant: DIC CORPORATION, Tokyo (JP)

(72) Inventors: Hiroyuki Takeda, Sakura (JP);
Hiroyuki Kagaya, Sakura (JP);
Masanori Hayashi, Sakura (JP);
Michiya Nakashima, Sakura (JP);
Hidekazu Miyano, Sakura (JP)

(73) Assignee: DIC CORPORATION, Tokyo (JP)

( * ) Notice: Subject to any disclaimer, the term of this patent is extended or adjusted under 35 U.S.C. 154(b) by 98 days.

(21) Appl. No.: 14/652,296

(22) PCT Filed: Dec. 24, 2013

(86) PCT No.: PCT/JP2013/084440
§ 371 (c)(1),
(2) Date: Oct. 28, 2015

(87) PCT Pub. No.: WO2014/103994
PCT Pub. Date: Jul. 3, 2014

(65) Prior Publication Data
US 2016/0053110 A1 Feb. 25, 2016

(30) Foreign Application Priority Data

Dec. 26, 2012 (JP) .................... 2012-282597
Jan. 8, 2013 (JP) .................... 2013-001048

(51) Int. Cl.
| | | |
|---|---|---|
| C08L 67/02 | (2006.01) |
| C08K 3/00 | (2006.01) |
| C09D 175/06 | (2006.01) |
| C09J 175/06 | (2006.01) |
| C09D 167/02 | (2006.01) |
| C09J 167/02 | (2006.01) |
| C08K 3/34 | (2006.01) |

(52) U.S. Cl.
CPC ............... *C08L 67/02* (2013.01); *C08K 3/00* (2013.01); *C08K 3/34* (2013.01); *C09D 167/02* (2013.01); *C09D 175/06* (2013.01); *C09J 167/02* (2013.01); *C09J 175/06* (2013.01); *C08K 2201/008* (2013.01); *C08L 2312/00* (2013.01)

(58) Field of Classification Search
CPC ..................................................... C08L 67/02
See application file for complete search history.

(56) References Cited

U.S. PATENT DOCUMENTS

| | | | |
|---|---|---|---|
| 4,757,097 A | 7/1988 | Dietrich et al. |
| 6,887,966 B2 | 5/2005 | Nomura et al. |
| 2003/0229194 A1 | 12/2003 | Nomura et al. |
| 2007/0259992 A1 | 11/2007 | Tamura et al. |
| 2009/0148640 A1 | 6/2009 | Yoshida et al. |
| 2013/0158186 A1 | 6/2013 | Takeda et al. |

FOREIGN PATENT DOCUMENTS

| | | |
|---|---|---|
| DE | 78100 A | 12/1970 |
| DE | 113923 A1 | 7/1975 |
| GB | 2 034 726 A | 6/1980 |
| JP | 63-6013 A | 1/1988 |
| JP | 2000096030 A | 4/2000 |
| JP | 2001107015 A | 4/2001 |
| JP | 2001-316558 A | 11/2001 |
| JP | 2003013032 A | 1/2003 |
| JP | 2004010655 A | 1/2004 |
| JP | 2006-176576 A | 7/2006 |
| JP | 2006-213860 A | 8/2006 |
| JP | 3829526 B2 | 10/2006 |
| JP | 3906095 B2 | 4/2007 |
| JP | 4054972 B2 | 3/2008 |
| JP | 2008156502 A | 7/2008 |
| JP | 2009280735 A | 12/2009 |
| JP | 2011-212983 A | 10/2011 |
| RU | 2 074 216 C1 | 2/1997 |
| WO | 2006/022431 A1 | 3/2006 |
| WO | 2007023856 A1 | 3/2007 |
| WO | 2011/162160 A1 | 12/2011 |
| WO | 2012133270 A | 10/2012 |
| WO | 2013/005767 A1 | 1/2013 |
| WO | 2013/027609 A1 | 2/2013 |
| WO | 2013/097057 A1 | 7/2013 |

OTHER PUBLICATIONS

International Search Report dated Apr. 15, 2014, issued in corresponding application No. PCT/JP2013/084440, (2 pages).
International Search Report for PCT/JP2012/070483, mailing date of Nov. 20, 2012.

*Primary Examiner* — Michael Pepitone
(74) *Attorney, Agent, or Firm* — Westerman, Hattori, Daniels & Adrian, LLP

(57) ABSTRACT

A polyester resin composition according to the present invention includes a polyester polyol having a glycerol skeleton and a curing agent, wherein 5 percent by mass or more of glycerol residue of the polyester polyol is contained in the polyester resin composition. The resin composition can provide an adhesive exhibiting an excellent adhesive force. The adhesive has a gas barrier property or a water vapor barrier property and, therefore, a gas barrier or water vapor barrier film can be provided by using the adhesive.

16 Claims, No Drawings

POLYESTER RESIN COMPOSITION, ADHESIVE AND FILM

CROSS-REFERENCE TO RELATED APPLICATION

This application is an application under Section 371 of PCT/JP2013/084440 filed on Dec. 24, 2013, claiming Japanese priorities of JP2013-001048 filed on Jan. 8, 2013 and JP2012-282597 filed on Dec. 26, 2012.

TECHNICAL FIELD

The present invention relates to a resin composition which can provide a film exhibiting excellent adhesive force and gas barrier property or a water vapor barrier property, a gas barrier or water vapor barrier film produced by curing the resin composition, and a gas barrier or water vapor barrier film laminate produced by curing the resin composition coated on the film.

BACKGROUND ART

Packaging materials typically used for packaging foods, drinks, and the like have been required to have wide variety of functions, for example, not only functions, such as, strength, resistance to cracking, retort resistance, and heat resistance but also excellent transparency capable of examining contents in order to protect contents from various types of distribution, preservation, e.g., cold storage, treatments, e.g., heat sterilization, and the like. On the other hand, in the case where bag is hermetically sealed by heat seal, a cast polyolefin film having excellent thermal workability is indispensable. However, the cast polyolefin film do not have many functions as the packaging material. In particular, a high barrier property has been strongly required for the purpose of holding quality of the content and holding the amount of the content. Such barrier packaging material is usually used as a composite flexible film in which different types of polymer materials and inorganic materials are stacked.

When a barrier function is imparted to a multilayer film, it is difficult to impart the barrier function to the cast polyolefin films used for an inner layer (sealant side) by coating or vapor deposition. Consequently, in many cases, the barrier function is imparted to various films (polyester resins, e.g., polyethylene terephthalate (hereafter abbreviated to PET), polyamide resins, and stretched olefin resins) used for the outer layer side.

In the case where the barrier function is imparted to these outer layer side films, vinylidene chloride exhibiting high retort resistance and gas or water vapor barrier property has been frequently used, although there are problems that, for example, dioxin is generated during burning for disposal. Also, in the case where polyvinyl alcohol resins and ethylene-polyvinyl alcohol copolymers are used as barrier coating materials, an oxygen barrier property is high, although there is a problem that a water vapor barrier property is degraded significantly. Also, a film provided with a vapor deposition layer of metal oxide, e.g., silica or alumina as a gas or water vapor barrier layer is expensive and, in addition, has problems that the flexibility is poor and gas•water vapor barrier performance is varied because of cracks and pinholes.

As for sheets having a water vapor barrier property, for example, PTL 1 describes a sheet containing cyclic olefin in the resin composition and exhibiting excellent water vapor barrier property, impact resistance, rigidity, and heat resistance and a container formed from the sheet.

Also, PTL 2 describes a material which is a film or a sheet containing a vinylidene chloride based copolymer.

As for a material having a tricyclodecane skeleton, for example, PTL 3 describes an example of use of maleimide compound having a condensed alicyclic structure and it is mentioned that the water vapor barrier property can be imparted to the obtained sealing agent.

Also, PTL 4 mentions that polyurethane is developed as an adhesive for transparent inorganic vapor deposition film and an anchor coating agent, polyester polyol is use as a raw material for polyurethane, and tricyclodecane dimethanol is used as a glycol component.

CITATION LIST

Patent Literature

PTL 1: Japanese Unexamined Patent Application Publication No. 2001-316558
PTL 2: Japanese Unexamined Patent Application Publication No. 2011-212983
PTL 3: Japanese Unexamined Patent Application Publication No. 2006-176576
PTL 4: Japanese Unexamined Patent Application Publication No. 2006-213860

SUMMARY OF INVENTION

Technical Problem

The issue to be solved by the present invention is to provide a polyester resin composition for a water vapor barrier material having solubility into general-purpose solvents, e.g., ethyl acetate and methyl ethyl ketone, and mainly containing a polyester resin exhibiting excellent water vapor barrier property as a barrier property, a film for a water vapor barrier material, in which the resin composition is coated on the film, a polyester resin composition for a gas barrier material having solubility into general-purpose solvents, e.g., ethyl acetate and methyl ethyl ketone, and mainly containing a polyester resin exhibiting excellent gas barrier property as a barrier property, and a gas barrier film, in which the resin composition is coated on the film.

Solution to Problem

The present inventors solved the above-described problems by a polyester resin composition containing a polyester resin, in which glycerol was the center of a polyester resin skeleton and a specific structure polyester skeleton was included in a branched chain thereof, and a curing agent which was able to react with this.

That is, the present invention provides a polyester resin composition containing a polyester polyol having a glycerol skeleton represented by General formula (1) and a curing agent which can react with this and a polyester resin composition containing a layered inorganic compound.

(1)

(In the formula (1), $R_1$ to $R_3$ independently represent a hydrogen atom or a group represented by General formula (2)

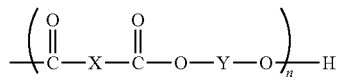

(in the formula (2), n represents an integer of 1 to 5, X represents an arylene group selected from the group consisting of 1,2-phenylene group, 1,2-naphthylene group, 2,3-naphthylene group, 2,3-anthraquinonediyl group, and 2,3-anthracenediyl group, which may have a substituent, or a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent, and Y represents an alkylene group having the carbon number of 2 to 6), where at least one of $R_1$ to $R_3$ is a group represented by General formula (2)).

Advantageous Effects of Invention

According to the present invention, the polyester resin composition for a barrier material exhibiting excellent solubility into general-purpose solvents, e.g., ethyl acetate and methyl ethyl ketone and exhibiting excellent gas barrier property or water vapor barrier property can be provided.

Also, the present invention includes a water vapor barrier film formed from a resin layer produced by curing the above-described polyester resin composition for a water vapor barrier material. This film is not specifically limited insofar as the film is, for example, a water vapor barrier composite film including at least a layer produced by curing the above-described polyester resin composition for a water vapor barrier material and a base material film layer.

In addition, the present invention includes a gas barrier film formed from a resin layer produced by curing the above-described polyester resin composition for a gas barrier material. This film is not specifically limited insofar as the film is, for example, a gas barrier composite film including at least a layer produced by curing the above-described polyester resin composition for a gas barrier material and a base material film layer.

DESCRIPTION OF EMBODIMENTS

That is, the present invention is composed of the following each item.

1. A polyester resin composition including a polyester polyol represented by General formula (1) and a curing agent,

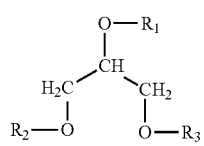

(in the formula (1), $R_1$ to $R_3$ independently represent a hydrogen atom or a group represented by General formula (2)

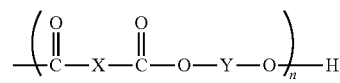

(in the formula (2), n represents an integer of 1 to 5, X represents an arylene group selected from the group consisting of 1,2-phenylene group, 1,2-naphthylene group, 2,3-naphthylene group, 2,3-anthraquinonediyl group, and 2,3-anthracenediyl group, which may have a substituent, or a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent, and Y represents an alkylene group having the carbon number of 2 to 6), where at least one of $R_1$ to $R_3$ is a group represented by General formula (2)).

2. The polyester resin composition according to the item 1, wherein 5 percent by mass or more of glycerol residue of the polyester polyol represented by General formula (1) above is contained in the polyester resin composition.

3. The polyester resin composition according to the item 1 or item 2, wherein the above-described curing agent is an isocyanate compound.

4. The polyester resin composition according to the item 3, wherein the above-described isocyanate compound is toluene diisocyanate, xylene diisocyanate, diphenylmethane diisocyanate, polymethylene polyphenyl polyisocyanate, a reaction product of toluene diisocyanate or xylene diisocyanate and a polyhydric alcohol having at least two hydroxyl groups in the molecule, or an isocyanate compound produced by a hydrogenation reaction of toluene diisocyanate, xylene diisocyanate, diphenylmethane diisocyanate, or polymethylene polyphenyl polyisocyanate.

5. A polyester resin composition by using the polyester resin composition according to any one of the items 1 to 4 as a resin composition for a barrier material.

6. The polyester resin composition according to the item 5, wherein the resin composition for a barrier material is a resin composition for a gas barrier material.

7. The polyester resin composition according to the item 5, wherein the resin composition for a barrier material is a resin composition for an oxygen barrier material or a water vapor barrier material.

8. The polyester resin composition according to any one of the items 1 to 7, further including a layered inorganic compound.

9. The polyester resin composition according to the item 8, wherein the layered inorganic compound has a nonionic interlayer property or does not have a water-swelling property.

10. The polyester resin composition according to the item 8 or item 9, wherein the layered inorganic compound contains particles having an average particle diameter of 0.1 μm or more.

11. The polyester resin composition according to any one of the items 8 to 10, wherein the content of the layered inorganic compound is 5 to 50 parts by mass, where the total mass of the polyester polyol, the curing agent, and the layered inorganic compound is specified to be 100 parts by mass.

12. A coating agent produced by curing the polyester resin composition according to any one of the items 1 to 11.

13. An adhesive produced by curing the polyester resin composition according to any one of the items 1 to 11.
14. A film including a resin layer produced by curing the polyester resin composition according to any one of the items 1 to 11.

In this regard, in the present invention, the term "barrier material" refers to a material having a barrier property, the term "gas barrier material" refers to a material having a barrier property against a gas, and the term "water vapor barrier material" refers to a material having a barrier property against a water vapor. Here, the water vapor refers to a vapor of water the gas refers to a gaseous material at ambient temperature and normal pressure. Examples of gas can include oxygen, nitrogen, carbon dioxide, helium, and argon. Also, the resin composition for a gas barrier material or the resin composition for a water vapor barrier material refers to a resin composition used for a gas barrier material or a water vapor barrier material.

(Polyester Resin Composition Having Glycerol Skeleton)

In General formula (1) above, $R_1$ to $R_3$ independently represent a hydrogen atom or a group represented by General formula (2)

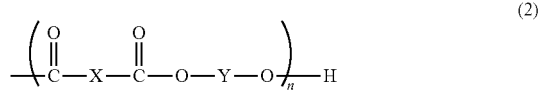
(2)

(in the formula (2), n represents an integer of 1 to 5, X represents an arylene group selected from the group consisting of 1,2-phenylene group, 1,2-naphthylene group, 2,3-naphthylene group, 2,3-anthraquinonediyl group, and 2,3-anthracenediyl group, which may have a substituent, or a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent, and Y represents an alkylene group having the carbon number of 2 to 6), where at least one of $R_1$ to $R_3$ is a group represented by General formula (2)). The polyester polyol concerned can be a polyester resin composition for a barrier material by including a curing agent.

Also, in the above-described formula (2), n represents an integer of 1 to 5, X represents a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent, and Y represents an alkylene group having the carbon number of 2 to 6.

In General formula (1), at least one of $R_1$, $R_2$, and $R_3$ has to be a group represented by General formula (2) above. Most of all, it is preferable that all $R_1$, $R_2$, and $R_3$ be groups represented by General formula (2) above.

Also, at least two compounds of a compound in which at least one of $R_1$, $R_2$, and $R_3$ is a group represented by General formula (2) above, a compound in which at least two of $R_1$, $R_2$, and $R_3$ are groups represented by General formula (2) above, and a compound in which all $R_1$, $R_2$, and $R_3$ are groups represented by General formula (2) above may form a mixture.

X represents an arylene group selected from the group consisting of 1,2-phenylene group, 1,2-naphthylene group, 2,3-naphthylene group, 2,3-anthraquinonediyl group, and 2,3-anthracenediyl group, which may have a substituent, or a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent. In the case where X is substituted with a substituent, x may be substituted with at least one substituent, and the substituent is bonded to any carbon atom different from a free radical on X. Examples of substituents include a chloro group, a bromo group, a methyl group, an ethyl group, an i-propyl group, a hydroxyl group, a methoxy group, an ethoxy group, a phenoxy group, a methylthio group, a phenylthio group, a cyano group, a nitro group, an amino group, a phthalimide group, a carboxyl group, a carbamoyl group, a N-ethylcarbamoyl group, a phenyl group, and a naphthyl group.

In General formula (2) above, Y represents an alkylene group, e.g., an ethylene group, a propylene group, a butylene group, a neopentylene group, a 1,6-hexylene group, a methylpentylene group, and a dimethylbutylene group. Among them, Y is preferably a propylene group or an ethylene group, and most preferably an ethylene group.

The polyester resin compound having the glycerol skeleton represented by General formula (1) above is produced by reacting glycerol, an aromatic polyvalent carboxylic acid in which carboxylic acid is substituted at an ortho-position or an anhydride thereof, and a polyhydric alcohol, as indispensable components.

Examples of aromatic polyvalent carboxylic acids in which carboxylic acid is substituted at an ortho-position or an anhydride thereof include orthophthalic acid or an anhydride thereof, naphthalene 2,3-dicarboxylic acid or an anhydride thereof, naphthalene 1,2-dicarboxylic acid or an anhydride thereof, anthraquinone 2,3-dicarboxylic acid or an anhydride thereof, 2,3-anthracene carboxylic acid or an anhydride thereof and the like, and dicarboxylic acid produced by hydrogenating the aromatic ring of orthophthalic acid, naphthalene 2,3-dicarboxylic acid, naphthalene 1,2-dicarboxylic acid, anthraquinone 2,3-dicarboxylic acid, and 2,3-anthracene carboxylic acid and anhydrides thereof. These compounds may have substituents at any carbon atom of the aromatic ring or alicyclic ring produced by hydrogenation of the aromatic ring. Examples of substituents include a chloro group, a bromo group, a methyl group, an ethyl group, an i-propyl group, a hydroxyl group, a methoxy group, an ethoxy group, a phenoxy group, a methylthio group, a phenylthio group, a cyano group, a nitro group, an amino group, a phthalimide group, a carboxyl group, a carbamoyl group, a N-ethylcarbamoyl group, a phenyl group, and a naphthyl group.

Also, as for the polyhydric alcohol components, alkylene diols having the carbon number of 2 to 6 are mentioned. Examples can include ethylene glycol, propylene glycol, butylene glycol, neopentyl glycol, and diols, e.g., 1,5-pentane diol, 3-methyl-1,5-pentane diol, 1,6-hexane diol, methylpentane diol, and dimethylbutane diol.

Examples of such polyester resin compound having the glycerol (GLY) skeleton represented by General formula (1) above can include a polyester resin (abbreviated to GLY (oPAEG)m, where m represents the total number of the groups in parentheses included in the polyester resin according to the present invention) by using orthophthalic acid (oPA) anhydride as the aromatic polyvalent carboxylic acid and using ethylene glycol (EG) as the polyhydric alcohol and a polyester resin (abbreviated to GLY(oNAEG)m, where m is the same as described above) by using naphthalene 2,3-dicarboxylic acid (oNA) as the aromatic polyvalent carboxylic acid and using ethylene glycol as the polyhydric alcohol. A polyester resin (abbreviated to GLY(oHHPAEG) m, where m is the same as described above by using orthohexahydroxyphthalic acid (HHoPA) anhydride as the polyvalent carboxylic acid, in which the aromatic ring has been hydrogenated, and using ethylene glycol as the polyhydric alcohol.

In the present invention, as for the content of the glycerol skeleton, the content of residue ($C_3H_5O_3$=89.07) excluding $R_1$ to $R_3$ in General formula (1) above is calculated relative to the mass of the total solid content of adhesive resin of the present invention by using Formula (a).

{[(the mole number of glycerol skeleton included in the molecule of P×89.07/number average molecular weight of the molecular of P]]×usage weight of P/total weight of solid content of coating agent composition}×100     Formula (a)

P: polyester resin compound having a glycerol skeleton

The present invention has a feature that the polyester resin composition contains 5 percent by mass or more of glycerol residue in order to exhibit a high barrier property.

(Method for Calculating Mass of Solid Content in Polyester Resin Composition for Barrier Material)

The mass of the total solid content of the adhesive resin is specified to be the mass determined by excluding the diluent solvent mass, the volatile component mass contained in the curing agent, and inorganic components from parts by mass of the polyester resin composition for a barrier material.

On the other hand, in the aromatic polyvalent carboxylic acid in which an acyl group is substituted at an ortho-position or an anhydride thereof and alicyclic polyvalent carboxylic acid or an anhydride thereof produced by hydrogenation of the aromatic ring of the aromatic polyvalent carboxylic acid in which an acyl group is substituted at an ortho-position or an anhydride thereof, serving as raw material of the polyester component, the skeleton have asymmetric structures. Therefore, it is estimated that the rotation of the molecular chain of the resulting polyester is suppressed and, thereby, it is estimated that excellent barrier property is exhibited. Also, it is estimated that the crystallinity, which interferes the base material adhesion because of the asymmetric structure, is low and, thereby, high solubility into solvents, e.g., ethyl acetate and methyl ethyl ketone, is exhibited and excellent barrier property is exhibited.

(Polyhydric Alcohol)

The polyester resin compound used in the present invention may be copolymerized with a polyhydric alcohol component other than alkylene diol having the carbon number of 2 to 6, serving as the polyhydric alcohol, within the bounds of not impairing the effects of the present invention. Specific examples can include aliphatic polyhydric alcohols, e.g., glycerol, erythritol, pentaerytol, dipentaerythritol, diethylene glycol, triethylene glycol, tetraethylene glycol, dipropylene glycol, tripropylene glycol, tetraethylene glycol, and tripropylene glycol, alicyclic polyhydric alcohols, e.g., cyclohexane dimethanol and tricyclodecane dimethanol, aromatic polyhydric phenol, e.g., hydroquinone, resorcinol, catechole, naphthalene diol, biphenol, bisphenol A, bisphenol F, and tetramethylbiphenol, or ethylene oxide stretches thereof, and hydrogenated alicyclics.

(Polyvalent Carboxylic Acid)

In the polyester resin according to the present invention, the aromatic polyvalent carboxylic acid in which carboxylic acid is substituted at an ortho-position or an anhydride thereof or the alicyclic polyvalent carboxylic acid or an anhydride thereof produced by hydrogenation of the aromatic ring of the aromatic polyvalent carboxylic acid in which carboxylic acid is substituted at an ortho-position or an anhydride thereof is indispensable as the polyvalent carboxylic acid component. However, other polyvalent carboxylic acid components may be copolymerized within the bounds of not impairing the effects of the present invention. Specifically, succinic acid, adipic acid, azelaic acid, sebacic acid, and dodecane dicarboxylic acid as for aliphatic polyvalent carboxylic acid, maleic anhydride, maleic acid, and fumaric acid as for unsaturated bond-containing polyvalent carboxylic acid, 1,3-cyclopentane dicarboxylic acid and 1,4-cyclohexane dicarboxylic acid as for alicyclic polyvalent carboxylic acid, terephthalic acid, isophthalic acid, pyromellitic acid, trimellitic acid, 1,4-naphthalene dicarboxylic acid, 2,5-naphthalene dicarboxylic acid, 2,6-naphthalene dicarboxylic acid, naphthalic acid, biphenyl dicarboxylic acid, diphenic acid and anhydride thereof, 1,2-bis (phenoxy)ethane-p,p'-dicarboxylic acid, and anhydrides or ester-forming derivatives of these dicarboxylic acids; polybasic acids, e.g., p-hydroxybenzoic acid, p-(2-hydroxyethoxy)benzoic acid, and ester-forming derivatives and the like of these dihydroxy carboxylic acid can be used alone or in combination of at least two types.

Among them, succinic acid, 1,3-cyclopentane dicarboxylic acid, isophthalic acid, 2,6-naphthalene dicarboxylic acid, 1,8-naphthalic acid, and diphenic acid are preferable.

A specific example of a manufacturing method will be described. After glycerol, an aromatic polyvalent carboxylic acid in which carboxylic acid is substituted at an ortho-position or an anhydride thereof, and a polyhydric alcohol component, which are used as raw materials, are charged together, the temperature is raised while agitation and mixing are performed to induce a dehydration condensation reaction. An aimed polyester resin can be obtained by continuing the reaction until the acid value on the basis of the acid value measuring method described in JIS-K0070 becomes 1 mgKOH/g or less, and the hydroxyl value Z mgKOH/g on the basis of the hydroxyl value measuring method described in the same JIS-K0070 becomes within ±5% of the numerical value (mgKOH/g) of the right side of Formula (b) below.

Z=3/((molecular weight of potassium hydroxide)× 1000×Mn)     Formula (b)

(in Formula (b), Mn represents the predetermined number average molecular weight of a predetermined trifunctional polyester resin)

Alternatively, each raw material may be reacted in a plurality of steps. Also, the hydroxyl value may be adjusted to within ±5% while a diol component volatilized at the reaction temperature is added.

Examples of catalysts used for the reaction include acid catalysts, for example, tin based catalysts, e.g., monobutyltin oxide and dibutyltin oxide, titanium based oxide, e.g., tetraisopropyl-titanate and tetra-butyl-titanate, and zirconia based catalysts, e.g., tetra-butyl-zirconate. It is preferable that the above-described titanium based oxide, e.g., tetraisopropyl-titanate and tetra-butyl-titanate, and the above-described zirconia catalysts be used in combination. The amount of the above-described catalyst used is 1 to 1,000 ppm relative to the total mass of the reaction raw materials used, and more preferably 10 to 100 ppm. If the amount is less than 1 ppm, an effect of the catalyst is not obtained easily, and if the amount is more than 1,000 ppm, a reaction to urethane thereafter tends to be interfered.

The number average molecular weight of the polyester resin compound having the above-described glycerol skeleton is preferably 450 to 5,000, and further preferably within the range of 450 to 2,000.

As for the curing agent, polyisocyanate described later is most preferable, an appropriate reaction time can be given, and in particular, excellent solubility and water vapor barrier performance are exhibited. The urethane group concentration at this time is preferably within the range of 1.0 to 6.0 mmol/g.

The glass transition temperature of the polyester resin compound having a glycerol skeleton, used in the present invention, is preferably within the range of −30° C. to 70° C., and more preferably −20° C. to 50° C. If the glass transition temperature is higher than 70° C., the flexibility of the polyester resin at about room temperature is reduced and, thereby, adhesion to the base material tends to be degraded. On the other hand, if the glass transition temperature is lower than −30° C., the molecular motion at about room temperature is active and, thereby, it is feared that a sufficient barrier property is not exhibited.

(Curing Agent)

The curing agent used in the present invention is not specifically limited insofar as the curing agent can react with the hydroxyl group of the above-described polyester resin, and known curing agents, e.g., polyisocyanate and epoxy compounds, can be used. Among them, the polyisocyanate is used preferably from the viewpoint of the adhesion and the retort resistance.

As for the polyisocyanate compounds, aromatic and aliphatic diisocyanates and polyisocyanates having divalent or more are mentioned, and either low molecular compound or high molecular compound may be employed. Examples include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, trimers of these isocyanate compounds, and adduct compounds obtained by reacting excess amounts of these isocyanate compounds with low molecular active hydrogen compounds, e.g., ethylene glycol, propylene glycol, metaxylylene alcohol, 1,3-bishydroxyethylbenzene, 1,4-bishydroxyethylbenzene, trimethylolpropane, glycerol, pentaerythritol, erythritol, sorbitol, ethylenediamine, monoethanolamine, diethanolamine, triethanolamine, and metaxylylenediamine, and alkylene oxide adducts thereof, and high molecular active hydrogen compounds, e.g., various polyester resins, polyether polyols, and polyamides.

The isocyanate compound may be a blocked isocyanate. Examples of isocyanate blocking agents include phenols, e.g., phenol, thiophenol, methylthiophenol, ethylthiophenol, cresol, xylenol, resorcinol, nitrophenol, and chlorophenol, oximes, e.g., acetoxime, methylethylketoxime, and cyclohexanone oxime, alcohols, e.g., methanol, ethanol, propanol, and butanol, halogen-substituted alcohols, e.g., ethylene chlorohydrin, and 1,3-dichloro-2-propanol, tertiary alcohols, e.g., t-butanol and t-pentanol, and lactams, e.g., ε-caprolactam, δ-valerolactam, γ-butyrolactam, and β-propyl lactam. In addition, aromatic amines, imides, active methylene compounds, e.g., acetylacetone, acetoacetic esters, and ethyl malonate, mercaptans, imines, ureas, and diaryl compounds, and sodium bisulfite are mentioned. The blocked cyanate is obtained by subjecting the above-described isocyanate compound and an isocyanate blocking agent to an addition reaction by a previously known appropriate method.

Meanwhile, in the case where a carboxylic acid remains at the terminal of the polyester resin used in the present invention, an epoxy compound can be used as a curing agent. Examples of epoxy compounds include diglycidyl ether of bisphenol A and oligomers thereof, diglycidyl ether of hydrogenated bisphenol A and oligomers thereof, orthophthalic acid diglycidyl ester, isophthalic acid diglycidyl ester, terephthalic acid diglycidyl ester, p-oxybenzoic acid diglycidyl ester, tetrahydrophthalic acid diglycidyl ester, hexahydrophthalic acid diglycidyl ester, succinic acid diglycidyl ester, adipic acid diglycidyl ester, sebacic acid diglycidyl ester, ethylene glycol diglycidyl ether, propylene glycol diglycidyl ether, 1,4-butane diol diglycidyl ether, 1,6-hexane diol diglycidyl ether, and polyalkylene glycol diglycidyl ethers, trimellitic acid triglycidyl ester, triglycidyl isocyanulate, 1,4-diglycidyl oxybenzene, diglycidyl propylene urea, glycerol triglycidyl ether, trimethylolethane triglycidyl ether, trimethylolpropane triglycidyl ether, pentaerythritol tetraglycidyl ether, and triglycidyl ether of glycerol alkylene oxide adducts.

In the case where the epoxy compound is used as the curing agent, for the purpose of facilitating curing, known general-purpose epoxy curing accelerator may be added appropriately within the bounds of not impairing the barrier property which is the aim of the present invention.

Most of all, it is preferable that the curing agent be the above-described polyisocyanate. The polyisocyanate having the above-described metaxylene skeleton is preferable for the reason that the barrier property can be improved by not only the hydrogen bond of the urethane group but also π-π stacking of aromatic rings. Likewise, the polyisocyanate having the above-described toluene skeleton is preferable for the reason that the barrier property can be improved by the same effect.

As for the polyisocyanate having the above-described metaxylene skeleton or toluene skeleton, a trimer of xylylene diisocyanate, 2,4-toluene diisocyanate, or 2,6-toluene diisocyanate, burette compound synthesized by the reaction with amine, and an adduct compound produced by the reaction with alcohol are mentioned. However, the adduct compound is more preferable because the solubility into an organic solvent used for a dry-lamination adhesive of polyisocyanate is obtained easily as compared with the trimer and the burette compound. As for the adduct compound, the adduct compound produced by the reaction with the alcohol appropriately from the above-described low molecular active hydrogen compound can be used. Among them, the adduct bodies with trimethylolpropane, glycerol, triethanolamine, and ethylene oxide adduct of metaxylenediamine are particularly preferable.

The polyester polyol having the above-described glycerol skeleton and the above-described curing agent is blended in such a way that as for the ratio of the polyester polyol having the glycerol skeleton to the curing agent, the hydroxyl group of the polyester resin compound having the glycerol skeleton to the reaction component of the curing agent becomes preferably 1/0.5 to 1/5 (equivalent ratio), and more preferably 1/1 to 1/3. In the case where the curing agent component is more than the range and is excessive, excess curing agent remains and, thereby, bleed out from the adhesive layer may occur after adhesion. On the other hand, in the case where the curing component is insufficient, adhesion strength may become insufficient.

As for the above-described curing agent, a known curing agent or accelerator selected in accordance with the types can be used in combination. Examples of adhesion accelerators include silane coupling agents, e.g., a hydrolysable alkoxy silane compound, titanate based coupling agents, aluminum based or other coupling agents, and epoxy resins. The silane coupling agents and the titanate based coupling agents are preferable from the viewpoint of improving the adhesion to various film materials.

(Layered Inorganic Compound)

The polyester resin composition for a barrier material according to the present invention may contain a layered inorganic compound.

The layered inorganic compound used in the present invention has an effect of enhancing the barrier property. Also, in the case where the polyester resin composition for a barrier material is used for a barrier adhesive, an effect of enhancing the lamination strength of the adhesive is exerted. In addition, in the case where polyester resin composition for a barrier material is used for a barrier coating agent, an effect of enhancing the blocking resistance characteristics of the coating agent is exerted.

The layered inorganic compound used in the present invention has a tabular shape and, therefore, has a feature to enhancing the lamination strength and the barrier property. At this time, it is preferable that these layered inorganic compounds do not have a water-swelling property. The reason for this is that the water vapor tends to permeate through portions where water is aggregated (that is, clusters are formed) as paths and, therefore, addition of a layered inorganic compound having a water-swelling property may degrade the water vapor barrier function.

Examples of layered inorganic compounds favorably used because of not having a water-swelling property, as described above, can include kaolinite-serpentine group clay mineral (halloysite, kaolinite, endellite, dickite, nacrite and the like, antigorite, chrysotile, and the like), pyrophyllite-talc group (pyrophyllite, talc, kerolite, and the like), magnesium hydroxide, aluminum hydroxide, barium hydroxide, iron hydroxide, zinc hydroxide, and nickel hydroxide, which have layered structure among various metal hydroxides, and, in addition, layered barium sulfate, zeolite, aluminum polyphosphate, boehmite, glass flake, and aluminum flake with respect to layered inorganic compound having no layer charge.

On the other hand, among layered inorganic compounds having layer charges, calcium montmorillonite and mica based compounds having potassium ions between layers, for example, muscovite, phlogopite, sericite, margarite, tetrasilicic mica, and taeniolite are favorably used as compounds not having a water-swelling property in spite of the layer having a negative charge. Meanwhile, hydrotalcites are known as materials in which layers have a positive charge, although these compound are favorably used because a water-swelling property is not exhibited. These minerals may be natural clay minerals or synthetic clay minerals. The inorganic layered compounds are used alone or in combination of at least two types.

(Average Particle Diameter of Layered Inorganic Compound)

The average particle diameter in the present invention refers to a particle diameter which exhibited the highest frequency of appearance, where particle size distribution of a certain layered inorganic compound is measured with a light scattering measuring apparatus. The average particle diameter of the layered inorganic compound used in the present invention is not specifically limited, although 0.1 µm or more is preferable, and 1 µm or more is further preferable. If the average particle diameter is 0.1 µm or less, the length of long side is small and, thereby, a detour path of the water molecule is not long and problems occur that the barrier performance is not improved easily and an adhesive force is not improved easily. The large side of the average particle diameter is not specifically limited. In the case where defects e.g., stripes, are generated on the coating surface due to presence of large layered inorganic compound depending on the coating method, a material having an average particle diameter of preferably 100 µm or less, and further preferably 20 µm or less may be used.

(Aspect Ratio of Layered Inorganic Compound)

The aspect ratio of the layered inorganic compound used in the present invention is preferably large for improving the barrier performance on the basis of a maze effect on the water vapor. Specifically, 10 or more is preferable, 50 or more is further preferable, and 70 or more is most preferable. Most of all, a material having an aspect ratio of more than 100 has been known in the mica based compounds, and has been used particularly favorably.

In the present invention, in the case where the total mass of the polyester polyol, the curing agent, and the layered inorganic compound are specified to be 100 parts by mass, the content of the layered inorganic compound is preferably 5 to 50 parts by mass, although not specifically limited insofar as the barrier performance is improved. If the content is 5 parts by mass or less, the barrier performance is not improved easily, and if the content is 50 parts by mass or more, in the case of adhesive use, the adhesiveness of the coating surface is reduced, so that the laminate operation may become difficult, and the lamination strength bay become insufficient. The content of the inorganic compound (PWC of blended material) can be determined by Formula (c) below.

PWC (%) of blended material=content of inorganic compound (solid content weight)/(content (solid content weight) of resin (*A*)+content (solid weight) of polyisocyanate+content (solid content) of inorganic compound)×100    (C)

(Method for Dispersing Layered Inorganic Compound)

A known dispersing method can be utilized as the method for dispersing the layered inorganic compound used in the present invention. Examples can include a dissolver, an ultrasonic homogenizer, a high pressure homogenizer, a paint conditioner, a ball mill, a roll mill, a sand mill, a sand grinder, DYNO-MILL, DISPERMAT, Nano Mill, SC Mill, and NANOMIZER. Further preferably, as for a machine which can generate a high shear force, Henschel mixer, Press Kneader, Banbury mixer, a planetary mixer, a two-roll, a three-roll, and the like are mentioned. One of them may be used alone or at least two type of apparatuses may be used in combination.

If dispersion of the layered inorganic compound is insufficient, an effect of introducing the inorganic compound is not exerted sufficiently in some cases. The following methods are preferably used as a method for achieving better dispersion. That method is a method in which the layered inorganic compound is dispersed into water or a mixed solvent of water and an organic solvent in advance, mixing with the polyester polyol is performed homogeneously and, thereafter, the water or the water and the organic solvent are removed. A homogeneous good dispersion of polyester polyol and the layered inorganic compound can be produced by this method. The resulting dispersion is cured with a curing agent and, thereby, a polyester resin composition exhibiting excellent barrier property can be produced. Specifically, the polyester polyol is made into a fluidizing state by raising a temperature, the layered inorganic compound dispersed in water or the mixed solvent of water and the organic solvent is introduced here, mixing with agitation is performed homogeneously, and heating temperature is raised under agitation or under reduced pressure to remove the water and the organic solvent. The organic solvent used for dispersing the layered inorganic compound is not specifically limited insofar as the organic solvent is mixed with water homogeneously and known common organic solvents can be mentioned. Examples of such solvents can include alcohols, e.g., alcohols methanol, ethanol, propanol, isopropanol, and butanol, ketone based solvents, e.g., acetone and 2-butanone, ester based solvents, e.g., ethyl acetate and propyl acetate, and others, e.g., tetrahydrofuran. However, in the case where a solvent having a high boiling point is used, removal of the organic solvent becomes difficult and, therefore, the boiling point of the organic solvent is preferably 200° C. or lower, and more preferably 120° C. or lower.

(Other Components)

The polyester resin composition according to the present invention may be blended with various additives within the bounds of not impairing the barrier property. Examples of additives include inorganic fillers, e.g., silica, alumina, mica, talc, aluminum flake, and glass flake, stabilizers (antioxidants, thermal stabilizer, ultraviolet absorber, and the like), plasticizers, antistatic agents, lubricators, blocking inhibitors, colorants, fillers, and nucleating agents.

Also, known acid anhydrides can be used in combination as a method for improving the resistance to acids of the cured coating film. Examples of acid anhydrides include phthalic acid anhydride, succinic acid anhydride, HET anhydride, himic acid anhydride, maleic acid anhydride, tetrahydrophthalic acid anhydride, hexahydrophthalic acid anhydride, tetrabromophthalic acid anhydride, tetrachlorophthalic acid anhydride, trimellitic acid anhydride, pyromellitic acid anhydride, benzophenotetracarboxylic acid anhydride, 2,3,6,7-naphthalenetetracarboxylic acid dianhydride, 5-(2,5-oxotetrahydrofuryl)-3-methyl-3-cyclohexene-1,2-dicarboxylic acid anhydride, and styrene maleic acid anhydride copolymer.

Also, as necessary, a compound and the like having an oxygen capturing function may be further added. Examples of compounds having an oxygen capturing function include low molecular organic compounds, which reacts with oxygen, e.g., hindered phenols, vitamin C, vitamin E, organic phosphorus compounds, gallic acid, and pyrogallol, and transition metal compounds, e.g., cobalt, manganese, nickel, iron, and copper.

Also, in order to improve adhesion to various film materials just after coating, adhesion-imparting agents, e.g., xylene resins, terpene resins, phenol resins, and rosin resins may be added, as necessary. In the case where they are added, within the range of 0.01 to 5 parts by mass relative to 100 parts by mass of the total weight of the epoxy resin and the epoxy resin curing agent.

(Hydrogenation Reaction)

A feature of the present invention is to use a compound having an arylene group included in the polyester polyol according to the present invention or a group produced by a hydrogenation reaction of an arylene group included in the isocyanate compound used as the curing agent. Here, as for the hydrogenation reaction, a known common method can be mentioned.

(Form of Barrier Film Produced by Curing Polyester Resin Composition)

The barrier film produced by curing polyester resin composition is obtained by applying a polyester resin composition coating solution to a film serving as a base material and performing curing. The coating solution may be a form of either a solvent type or a solventless type. In the case of the solvent type, the solvent is used as a reaction medium in production of the polyester resin and the curing agent, and is further used as a diluent in painting. Examples of usable solvents include esters, e.g., ethyl acetate, butyl acetate, and cellosolve acetate, ketones, e.g., methyl ethyl ketone, isobutyl ketone, and cyclohexanone, ethers, e.g., tetrahydrofuran and dioxane, aromatic hydrocarbons, e.g., toluene and xylene, halogenated hydrocarbons, e.g., methylene chloride and ethylene chloride, dimethyl sulfoxide, and dimethyl sulfonamide. In particular, the polyester resin composition according to the present invention exhibits excellent solubility into methyl acetate and methyl ethyl ketone solvent and, therefore, it is preferable that methyl acetate and methyl ethyl ketone be used.

The method for applying the polyester resin according to the present invention is not specifically limited, and a known method may be employed. For example, in the case where the solvent type is employed and the viscosity can be adjusted, coating is performed by a gravure roll coating system and the like in many cases. Meanwhile, in the case where the solventless type is employed, the viscosity at room temperature is high, and the gravure roll coating system is not suitable, it is possible to coat with a roll coater while the temperature is raised. In the case where the roll coater is used, the coating is performed in the state in which heating to room temperature to about 120° C. is performed in such a way that the viscosity of the polyester resin composition for a barrier material according to the present invention becomes about 500 to 2,500 mPa·s.

The polyester resin composition according to the present invention can be used as a polyester resin composition for a barrier material for polymers, paper, metals and the like in various uses in which barrier property of the polyester resin composition for a barrier material is required.

As for one specific use, a polyester resin composition for a water vapor barrier material for film laminate will be described below.

A water vapor barrier film produced by curing the polyester resin composition according to the present invention can be used as the water vapor barrier film for film laminate.

The film for laminating used in the present invention is not specifically limited, and a thermoplastic resin film suitable for the predetermined use can be selected appropriately. Examples for food packaging include polyolefin films, e.g., PET films, polystyrene films, polyamide films, polyacrylonitrile films, polyethylene films (LLDPE: low density polyethylene film, HDPE: high density polyethylene film), and polypropylene films (CPP: cast polypropylene film, OPP: oriented polypropylene film), polyvinyl alcohol films, and ethylene-vinyl alcohol copolymer film. These may be subjected to an orientation treatment. As for the orientation treatment method, in general, a resin is melt-extruded into the shape of a sheet by an extrusion film formation method and, thereafter, simultaneous biaxial orientation or sequential biaxial orientation is performed. In this regard, in the case of the sequential biaxial orientation, initially a vertical orientation treatment is performed and then, horizontal orientation is performed in general. Specifically, a method in which the vertical orientation by utilizing a difference in speed between rolls and the horizontal orientation by using a tenter are combined is used in many cases.

Meanwhile, the film surface may be subjected to various surface treatments, e.g., a flame treatment and a corona discharge treatment, as necessary, in such a way that an adhesion layer having no defect, e.g., film shortage and cissing, is formed.

One of the above-described thermoplastic resin films is coated with the polyester resin composition for a water vapor barrier material according to the present invention. Thereafter, a drying step and an aging step are performed. Another thermoplastic resin film is stacked on the resulting water vapor barrier film produced by curing the polyester resin composition according to the present invention by using a known dry-lamination adhesive and bonding by lamination is performed to obtain a film for water vapor barrier material. As for the lamination method, known lamination, e.g., dry lamination, non-solvent lamination, and extrusion lamination, can be used. Specifically, in the dry lamination method, one base material film is coated with the polyester resin composition for a water vapor barrier material according to the present invention by a gravure roll system and, thereafter, the other base material film is stacked, and bonding is performed by dry lamination (dry lamination method). The temperature of the laminate roll is preferably room temperature to about 60° C. Meanwhile, as for the non-solvent lamination, the base material film is coated with the polyester resin composition for a barrier material according to the present invention heated to room temperature to about 120° C. in advance with a roll of, for example, a roll coater heated to room temperature to about 120° C. and, thereafter, a new film material is bonded to the surface immediately, so that a laminate film can be obtained. The laminate pressure is preferably 10 to 300 kg/cm$^2$.

In the case of an extrusion lamination method, the base material film is coated with an organic solvent solution of the polyester resin composition for a water vapor barrier material according to the present invention as an adhesion aid (anchor coat agent) with a roll of, for example, a gravure roll. Drying of the solvent and a curing reaction are performed at room temperature to 140° C. Subsequently, a molten polymer material is laminated with an extruder, so that a laminate film can be obtained. As for the polymer material to be melted, polyolefin resins, e.g., low density polyethylene resins, linear low density polyethylene resins, and ethylene-vinyl acetate copolymer resins, are preferable.

In this regard, the film for a water vapor barrier material according to the present invention is preferably subjected to aging after production. In the case where polyisocyanate is used as the curing agent, the aging condition is between 12 to 240 hours at room temperature to 80° C. and in this period of time, the polyester resin is reacted with the curing agent and the adhesion strength is generated.

The polyester resin composition for a gas barrier material can be used in the same manner as that described above.

In the present invention, in order to impart a still higher barrier function, a film laminated with a vapor deposition layer of a metal, e.g., aluminum, or a metal oxide, e.g., silica or alumina, may be used in combination, as necessary.

The polyester resin composition for a barrier material according to the present invention can be favorably used as a polyester resin composition for a barrier material used for a laminate film produced by bonding a plurality of resin films of the same type or different types. The resin film may be selected appropriately in accordance with the purposes. For example, in the case of use as a packaging material, a composite film composed of 2 layers in which a thermoplastic resin film selected from PET, OPP, and polyamide is used as an outermost layer and a thermoplastic resin film selected from cast polypropylene (hereafter abbreviated to CPP) and low density polyethylene film (hereafter abbreviated as LLDPE) is used as the innermost layer, a composite film composed of 3 layers by using, for example, a thermoplastic resin film which is selected from PET, polyamide, and OPP and which forms the outermost layer, a thermoplastic resin film which is selected from OPP, PET, and polyamide and which forms the intermediate layer, and a thermoplastic resin film which is selected from CPP and LLDPE and which forms the innermost layer, and a composite film composed of 4 layers by using, for example, a thermoplastic resin film which is selected from OPP, PET, and polyamide and which forms the outermost layer, a thermoplastic resin film which is selected from PET and nylon and which forms the first intermediate layer, a thermoplastic resin film which is selected from PET and polyamide and which forms the second intermediate layer, and a thermoplastic resin film which is selected from LLDPE and CPP and which forms the innermost layer can be favorably used as oxygen and water vapor barrier films and food packaging materials. As described above, the uses of the polyester resin composition for a barrier material according to the present invention are not limited to the PET/CPP film and the composition can be used widely.

The polyester resin composition for a barrier material according to the present invention is characterized by having high gas barrier property or water vapor barrier property. Therefore, the laminate film formed from the polyester resin composition for a barrier material exhibits very high level of gas barrier property or water vapor barrier property without employing commonly used barrier materials, e.g., PVDC coat layers, polyvinyl alcohol (PVA) coat layers, ethylene-vinyl alcohol copolymer (EVOH) film layers, metaxylylene adipamide film layers, inorganic vapor deposition film layers in which alumina, silica, or the like is vapor deposited, and the like. Also, the polyester resin composition for a barrier material is used together for bonding these conventional barrier materials and the sealant material and, thereby, the gas barrier property or the water vapor barrier property of the resulting film can be improved considerably.

EXAMPLES

Next, the present invention will be specifically described with reference to the examples and the comparative examples. In the examples, the terms "part" and "%" are on a mass basis unless otherwise specified.

(Production Example 1) Manufacturing Method for Polyester Resin "GLY(oPAEG) 1" Made from Glycerol, Orthophthalic Acid, and Ethylene Glycol A polyester reaction container provided with an agitator, a nitrogen gas introduction tube, a snyder tube, and a condenser was charged with 92.09 parts of glycerol, 148.1 parts of phthalic acid anhydride, 64.57 parts of ethylene glycol, and 0.03 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(oPAEG) 1" having a number average molecular weight of 284 was obtained. The percent by mass of glycerol included in the resulting polyester resin was 89.07/284.26=31.33%.

(Production Example 2) Manufacturing Method for Polyester Resin "GLY(oPAEG) 2" Made from Glycerol, Orthophthalic Acid, and Ethylene Glycol A polyester reaction container provided with an agitator, a nitrogen gas introduction tube, a snyder tube, and a condenser was charged with 92.09 parts of glycerol, 296.2 parts of phthalic acid anhydride, 124.1 parts of ethylene glycol, and 0.05 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(oPAEG) 2" having a number average molecular weight of 476.43 was obtained. The percent by mass of glycerol included in the resulting polyester resin was 18.69%.

(Production Example 3) Manufacturing Method for Polyester Resin "GLY(oPAEG) 3" Made from Glycerol, Orthophthalic Acid, and Ethylene Glycol A polyester reaction container provided with an agitator, a nitrogen gas introduction tube, a snyder tube, and a condenser was charged with 92.09 parts of glycerol, 444.36 parts of phthalic acid anhydride, 186.21 parts of ethylene glycol, and 0.07 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(oPAEG) 3" having a number average molecular weight of 668.60 was obtained. The percent by mass of glycerol included in the resulting polyester resin was 13.32%.

(Production Example 4) Manufacturing Method for Polyester Resin "GLY(oPAEG) 6" Made from Glycerol, Orthophthalic Acid, and Ethylene Glycol A polyester reaction container provided with an agitator, a nitrogen gas introduction tube, a snyder tube, and a condenser was charged with 92.09 parts of glycerol, 888.72 parts of phthalic acid anhydride, 372 parts of ethylene glycol, and 0.13 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(oPAEG) 6" having a number average molecular weight of 1245.10 was obtained. The percent by mass of glycerol included in the resulting polyester resin was 7.15%.

(Production Example 5) Manufacturing Method for Polyester Resin "GLY(oNAEG) 2" Made from Glycerol, 2,3-Naphthalene Dicarboxylic Acid, and Ethylene Glycol A polyester reaction container provided with an agitator, a nitrogen gas introduction tube, a snyder tube, and a condenser was charged with 92.09 parts of glycerol, 396.34 parts of 2,3-naphthalene dicarboxylic acid anhydride, 124.14 parts of ethylene glycol, and 0.06 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(oNAEG) 2" having a number average molecular weight of 592.59 was obtained. The percent by mass of glycerol included in the resulting polyester resin was 15.03%.

(Production Example 6) Manufacturing Method for Polyester Resin "EGoPA" Made from Orthophthalic Acid and Ethylene Glycol A polyester reaction container provided with an agitator, a nitrogen gas introduction tube, a snyder tube, and a condenser was charged with 396.34 parts of phthalic acid anhydride, 173.73 parts of ethylene glycol, and 0.05 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "oPAEG" having a number average molecular weight of 600 was obtained. The percent by mass of glycerol included in the resulting polyester resin was 0.0%.

(Production Example 7) Manufacturing Method for Glycerol, Isophthalic Acid, and Ethylene Glycol Polyester Resin "GLY(iPAEG) 3"

A polyester reaction container provided with an agitator, a nitrogen gas introduction tube, a snyder tube, and a condenser was charged with 92.09 parts of glycerol, 498.39 parts of isophthalic acid, 186.21 parts of ethylene glycol, and 0.07 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY(iPAEG) 3" having a number average molecular weight of 668.6 was obtained. The percent by mass of glycerol included in the resulting polyester resin was 13.32%.

(Production Example 8) Manufacturing Method for Polyester Polyol "TMP(oPAEG) 3" Made from Trimethylol Propane, Orthophthalic Acid Anhydride, and Ethylene Glycol Polyester polyol "TMP(oPAEG) 3" having a number average molecular weight of 710.68 was obtained in the same manner as with Production example 3 except that 92.09 of glycerol in Production example 3 was replaced with 134.17 parts of trimethylol propane.
The percent by mass of glycerol included in the resulting polyester polyol was 0.0%.

(Production Example 9) Manufacturing Method for Polyester Polyol "TMP(oPAEG) 6" Made from Trimethylol Propane, Orthophthalic Acid Anhydride, and Ethylene Glycol Polyester polyol "TMP(oPAEG) 6" having a number average molecular weight of 1287.18 was obtained in the same manner as with Production example 4 except that 92.09 parts of glycerol in Production example 4 was replaced with 134.17 parts of trimethylol propane.
The percent by mass of glycerol included in the resulting polyester polyol was 0.0%.

(Production Example 10) Manufacturing Method for Polyester Resin "GLY3oPA4EG2" Made from Glycerol, Orthophthalic Acid, and Ethylene Glycol A polyester reaction container provided with an agitator, a nitrogen gas introduction tube, a snyder tube, and a condenser was charged with 276.27 parts of glycerol, 592.4 parts of phthalic acid anhydride, 130.2 parts of ethylene glycol, and 0.09 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY3oPA4EG2" having a number average molecular weight of 920.89 was obtained. The resulting polyester resin has three glycerol per molecule in average and, therefore, the percent by mass of glycerol included in the resulting resin was (89.07×3)/920.89=29.02%.

(Production Example 11) Manufacturing Method for Polyester Resin "GLY3oPA7EG5" Made from Glycerol, Orthophthalic Acid, and Ethylene Glycol A polyester reaction container provided with an agitator, a nitrogen gas introduction tube, a snyder tube, and a condenser was charged with 276.27 parts of glycerol, 1036.84 parts of phthalic acid anhydride, 325.87 parts of ethylene glycol, and 0.16 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY3oPA7EG5" having a number average molecular weight of 1497.46 was obtained. The resulting polyester resin has three glycerol per molecule in average and, therefore, the percent by mass of glycerol included in the resulting resin was (89.07×3)/1497.46=17.84%.

(Production Example 12) Manufacturing Method for Polyester Resin "GLY5oPA8EG4" Made from Glycerol, Orthophthalic Acid, and Ethylene Glycol A polyester reaction container provided with an agitator, a nitrogen gas introduction tube, a snyder tube, and a condenser was charged with 460.45 parts of glycerol, 1185 parts of phthalic acid anhydride, 260.09 parts of ethylene glycol, and 0.19 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY5oPA8EG4" having a number average molecular weight of 1749.70 was obtained. The resulting polyester resin has three glycerol per molecule in average and, therefore, the percent by mass of glycerol included in the resulting resin was (89.07×3)/1749.70=25.45%.

(Production Example 13) Manufacturing Method for Polyester Resin "GLY3oHHPA4EG2" Made from Glycerol, Hexahydrophthalic Acid, and Ethylene Glycol A polyester reaction container provided with an agitator, a nitrogen gas introduction tube, a snyder tube, and a condenser was charged with 276.27 parts of glycerol, 616.64 parts of hexahydrophthalic acid anhydride, 130.2 parts of ethylene glycol, and 0.19 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY3oHHPA4EG2" having a number average molecular weight of 945.05 was obtained. The resulting polyester resin has three glycerol per molecule in average and, therefore, the percent by mass of glycerol included in the resulting resin was (89.07×3)/945.05=28.27%.

(Production Example 14) Manufacturing Method for Polyester Resin "GLY3oMHPA4EG2" Made from Glycerol, 4-Methylhexahydrophthalic Acid, and Ethylene Glycol A polyester reaction container provided with an agitator, a nitrogen gas introduction tube, a snyder tube, and a condenser was charged with 276.27 parts of glycerol, 672.76 parts of 4-methylhexahydrophthalic acid anhydride, 130.2 parts of ethylene glycol, and 0.19 parts of titanium tetraisopropoxide, heating was performed gradually in such a way that a rectifying tube upper portion temperature did not exceed 100° C. and the internal temperature was held at 220° C. An esterification reaction was finished when the acid value became 1 mgKOH/g or less, so that polyester resin "GLY3oMHPA4EG2" having a number average molecular weight of 1001.17 was obtained. The resulting polyester resin has three glycerol per molecule in average and, therefore, the percent by mass of glycerol included in the resulting resin was (89.07×3)/1001.17=26.53%.

(Production Example 15) Manufacturing Method for Adduct Compound of 1,3-Bis{Bis-[2-Hydroxyethyl]Aminomethyl}Benzene and XDI A reaction container provided with an agitator, a nitrogen gas introduction tube, a cooling condenser, and a dropping funnel was charged with 790.36 parts of xylylene diisocyanate and agitation was performed while heating to 70° C. was performed.

Dropping of 312.40 parts of the above-described 1,3-bis{bis-[2-hydroxyethyl]aminomethyl}benzene was performed over 1 hour. Agitation was continued at 70° C. for 3 hours after the dropping, 473 parts of methyl ethyl ketone dehydrated to have a water content of 1,000 ppm in advance was added, and agitation was performed. After gradual cooling to room temperature, suspended gel was separated with a 100-mesh brass wire gauze, so that XDI adduct compound of compound which is ethylene oxide 4-mol adduct of metaxylenediamine was obtained. The non-volatile content of the above-described adduct compound solution determined on the basis of JIS-K-6910 was 70.0%, and NCO % determined on the basis of JIS-K1603 was 9.6%.

(Production Example 16) Production of Adduct Compound of Trimethylol Propane and 2,6-Tolylene Diisocyanate A reaction container provided with an agitator, a nitrogen gas introduction tube, a cooling condenser, and a dropping funnel was charged with 522.48 parts of 2,6-tolylene diisocyanate and agitation was performed while heating to 70° C. was performed.

Dropping of 134.17 parts of trimethylol propane was performed over 1 hour. Agitation was continued at 70° C. for 3 hours after the dropping, 284 parts of methyl ethyl ketone dehydrated to have a water content of 1,000 ppm in advance was added, and agitation was performed. After gradual cooling to room temperature, suspended gel was separated with a 100-mesh brass wire gauze, so that the adduct compound of trimethylol propane and 2,6-tolylene diisocyanate was obtained. The non-volatile content of the above-described adduct compound solution determined on the basis of JIS-K-6910 was 70.0%, and NCO % determined on the basis of JIS-K1603 was 13.40%.

(Curing Agent a)

Curing agent a was produced by mixing "TAKENATE D-110N" (trimethylol propane adduct compound of metaxylylene diisocyanate non-volatile component 75.0% NCO % 11.5%) produced by Mitsui Chemicals, Inc., and "TAKENATE 500" (metaxylylene diisocyanate non-volatile content >99% NCO % 44.6%) produced by Mitsui Chemicals, Inc., at the ratio of 50/50 (weight ratio).
The non-volatile content of Curing agent a was 87.5% and NCO % was 28.05%.

(Curing Agent b)

"TAKENATE D-110N" (trimethylol propane adduct compound of metaxylylene diisocyanate non-volatile component 75.0% NCO % 11.5%) produced by Mitsui Chemicals, Inc., was specified to be Curing agent b.

(Curing Agent c)

The adduct compound (non-volatile content was 70.0%, NCO % was 9.4%) of trimethylol propane and 2,6-tolylene diisocyanate synthesized in Production 16 was specified to be Curing agent c.

(Curing Agent d)

The adduct compound (non-volatile content 70.0%, NCO % 9.6%) of 1,3-bis{bis-[2-hydroxyethyl]aminomethyl}benzene and XDI synthesized in Production 15 was specified to be Curing agent d.

(Curing Agent e)

"TAKENATE D-120N" (trimethylol propane adduct compound of hydrogenated metaxylylene diisocyanate non-volatile component 75.0% NCO % 11%) produced by Mitsui Chemicals, Inc., was specified to be Curing agent e.

(Curing Agent f)

"COSMONATE NBDI" (norbornane diisocyanate non-volatile component 100% NCO % 40.8%) produced by Mitsui Chemicals, Inc., was specified to be Curing agent f.

(Curing Agent g)

"Lupranate MI" (diphenylmethane diisocyanate non-volatile component 100% NCO % 33.3%) produced by BASF INOAC Polyurethanes Ltd., was specified to be Curing agent g.

(Curing Agent h)

"Sumidur 44V20L" (polymericdiphenylmethane diisocyanate non-volatile component 100% NCO % 31.5%) produced by Sumika Bayer Urethane Co., Ltd., was specified to be Curing agent h.

(Curing Agent i)

"Desmodur W" (hydrogenated diphenylmethane diisocyanate non-volatile component 100% NCO % 31.8%) produced by Byer was specified to be Curing agent i.

(Curing Agent j)

"TAKENATE 500" (xylylene diisocyanate non-volatile component 100% NCO % 44.7%) produced by Mitsui Chemicals, Inc., was specified to be Curing agent j.

(Curing Agent k)

"TAKENATE 600" (hydrogenated xylylene diisocyanate non-volatile component 100% NCO % 43.2%) produced by Mitsui Chemicals, Inc., was specified to be Curing agent k.

(Manufacturing Method for Polyester Resin Coating Solution in Examples 1 to 20 and Comparative Examples 1 to 4)

The polyester polyol obtained in the above-described manufacturing method was diluted with methyl ethyl ketone to obtain a resin solution having a non-volatile content of 50%. In addition, Curing agents a, b, c, d, e, f, g, h, i, j, and k were blended as shown in Tables 1 and 2 and Table 5, so that polyester resin coating solutions to be used in the coating method described later were obtained.

(Coating Method)

The polyester resin coating solution was applied by using a bar coater to a PET film ("E-5100" produced by Toyobo Co., Ltd.) having a thickness of 12 μm in such a way that the amount of coating became 5.0 g/m² (solid content). The diluent solvent was volatilized and dried with a dryer set at a temperature of 70° C. Then, the resulting composite film was cured at 40° C. for 3 days to obtain a barrier film according to the present invention.

(Lamination Method 1)

The polyester resin coating solution was applied by using a bar coater to a PET film ("E-5100" produced by Toyobo Co., Ltd.) having a thickness of 12 μm in such a way that the amount of coating became 5.0 g/m² (solid content). The diluent solvent was volatilized and dried with a dryer set at a temperature of 70° C. Then, the resulting composite film and a non-stretch PP film ("ZK-93KM" produced by TORAY ADVANCED FILM Co., Ltd.) were subjected to dry laminate at a temperature of 40° C., a pressure of 0.4 MPa, and a laminate speed 40 m/min, so that PET/polyester resin composition/CPP laminate was obtained.

(Lamination Method 2)

The polyester resin coating solution was applied by using a bar coater to a nylon (Ny) film ("EMBLEM ON-BC" produced by UNITIKA LTD.) having a thickness of 15 μm in such a way that the amount of coating became 5.0 g/m² (solid content). The diluent solvent was volatilized and dried with a dryer set at a temperature of 70° C. Then, the resulting composite film and a non-oriented LLDPE (TUX-HC 60μ produced by Mitsui Chemicals Tohcello, Inc.) were subjected to dry laminate at a temperature of 40° C., a pressure of 0.4 MPa, and a laminate speed 40 m/min, so that Ny/polyester resin composition/LLDPE laminate was obtained.

(Lamination Method 3)

The polyester resin coating solution was applied by using a bar coater to a PET film ("E-5100" produced by Toyobo Co., Ltd.) having a thickness of 12 μm in such a way that the amount of coating became 5.0 g/m² (solid content). The diluent solvent was volatilized and dried with a dryer set at a temperature of 70° C. Then, the resulting composite film and a nylon (Ny) film ("EMBLEM ON-BC" produced by UNITIKA LTD.) having a thickness of 15 μm were subjected to dry laminate at a temperature of 40° C., a pressure of 0.4 MPa, and a laminate speed 40 m/min, so that PET/polyester resin composition/Ny laminate was obtained.

(Lamination Strength Measurement)

The laminate in the example was produced. Thereafter, curing was performed at 40° C. for 72 hours. Subsequently, the lamination strength was measured by a 180° peeling test at a peeling speed of 200 mm/min in conformity with JIS K6854. The unit of the strength is N/15 mm.

(Oxygen Permeability)

The water vapor barrier film subjected to the aging was measured by using an oxygen permeation tester OX-TRAN2/21MH produced by MOCON at 23° C. under 0% RH and 90% RH atmosphere in conformity with JIS-K7126 (equal pressure method).

Also, the oxygen barrier property of a resin coating film only, produced by curing the polyester resin composition, was calculated from the measurement results of the barrier laminate film, the PET film, and the nylon film by using Formula (d). The measurement results were converted to the permeability at the amount of coating of 5 g/m². tion, was calculated from the measurement results of the water vapor barrier laminate film, the PET film, and the nylon film by using Formula (d). The measurement results were converted to the permeability at the amount of coating of 5 g/m².

$$1/P = 1/P1 + 1/P2 + 1/P3 \quad (d)$$

P: oxygen permeability of barrier laminate film
P1: oxygen permeability of coating film only
P2: oxygen permeability of 12-μm PET film (calculated on the basis of 0% RH: 130 cc/m²·24 hour·atm, 90% RH: 74 cc/m²·24 hour·atm)
P3: water vapor permeability of 15-μm nylon film (calculated on the basis of 0% RH: 50 cc/m²·24 hour·atm, 90% RH: 74 cc/m²·24 hour·atm)

(Water Vapor Permeability)

The laminate film subjected to the aging was evaluated by using a measuring apparatus produced by Illinois in an atmosphere of 40° C. and 90% RH in conformity with the water vapor permeability testing method conductivity method "ISO-15106-3". In this regard RH represents the humidity.

Also, the water vapor barrier property of a resin coating film only, produced by curing the polyester resin composi- $$1/P = 1/P1 + 1/P2 + 1/P3 \quad (d)$$

P: water vapor permeability of water vapor barrier laminate film
P1: water vapor permeability of coating film only
P2: water vapor permeability of 12-μm PET film (calculated on the basis of 46 g/m²·24 hour)
P3: water vapor permeability of 15-μm nylon film (calculated on the basis of 260 g/m²·24 hour)

(Reference Value)

The water vapor permeability of a PET (biaxial orientation polyethylene terephthalate) film having a thickness of 12 μm ("E-5100" produced by Toyobo Co., Ltd.) was measured and was converted to the permeability at a film thickness of 5 g/m².

The results are shown in Tables 3 and 4 and Table 6.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| GLY (oPAEG) 1 | 100 | | | | | | | | | |
| GLY (oPAEG) 2 | | 100 | | | | | | | | |
| GLY (oPAEG) 3 | | | 100 | | | | | | | |
| GLY (oPAEG) 6 | | | | 100 | | | | | | |
| GLY (oNAEG) 2 | | | | | 100 | | | | | |
| GLY3oPA4EG2 | | | | | | 100 | | | | |
| GLY3oPA7EG5 | | | | | | | 100 | | | |
| GLY5oPA8EG4 | | | | | | | | 100 | | |
| GLYoHHPAEG | | | | | | | | | 100 | |
| GLYoMHPAEG | | | | | | | | | | 100 |
| Curing agent a | 157.84 | 94.25 | 67.17 | 36.06 | 77.85 | | | | | |
| Curing agent b | | | | | | 177.2 | 209.2 | 265.5 | 270.3 | 241.6 |
| Curing agent c | | | | | | | | | | |
| Curing agent d | | | | | | | | | | |
| Curing agent e | | | | | | | | | | |
| Curing agent f | | | | | | | | | | |
| Curing agent g | | | | | | | | | | |
| Curing agent h | | | | | | | | | | |
| Curing agent i | | | | | | | | | | |
| Curing agent j | | | | | | | | | | |
| Curing agent k | | | | | | | | | | |
| Methyl ethyl ketone (diluent) | 100 | 100 | 100 | 100 | 100 | 100 | 100 | 100 | 100 | 100 |
| Composition total (parts) | 357.84 | 294.25 | 267.17 | 236.06 | 277.85 | 377.2 | 409.2 | 465.5 | 470.3 | 441.6 |
| Curable resin mass (parts) | 238.11 | 182.47 | 158.78 | 131.55 | 168.12 | 232.90 | 256.90 | 299.13 | 302.73 | 281.20 |
| Glycerol residue (=C₃H₅O₃) content in curable resin % | 13.16 | 10.25 | 8.39 | 5.44 | 9.19 | 12.46 | 6.94 | 8.51 | 9.33 | 9.43 |

TABLE 2

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| GLY (oPAEG) 1 | | | | | | | | | | |
| GLY (oPAEG) 2 | | | | | | | | | | |
| GLY (oPAEG) 3 | 100 | 100 | 100 | 100 | 100 | 100 | 100 | 100 | 100 | 100 |
| GLY (oPAEG) 6 | | | | | | | | | | |
| GLY (oNAEG) 2 | | | | | | | | | | |
| GLY3oPA4EG2 | | | | | | | | | | |
| GLY3oPA7EG5 | | | | | | | | | | |
| GLY5oPA8EG4 | | | | | | | | | | |

TABLE 2-continued

| | Example 11 | Example 12 | Example 13 | Example 14 | Example 15 | Example 16 | Example 17 | Example 18 | Example 19 | Example 20 |
|---|---|---|---|---|---|---|---|---|---|---|
| GLYoHHPAEG | | | | | | | | | | |
| GLYoMHPAEG | | | | | | | | | | |
| Curing agent a | | | | | | | | | | |
| Curing agent b | 164.17 | | | | | | | | | |
| Curing agent c | | 140.66 | | | | | | | | |
| Curing agent d | | | 161.91 | | | | | | | |
| Curing agent e | | | | 171.63 | | | | | | |
| Curing agent f | | | | | 64.78 | | | | | |
| Curing agent g | | | | | | 79.34 | | | | |
| Curing agent h | | | | | | | 83.9 | | | |
| Curing agent i | | | | | | | | 83.12 | | |
| Curing agent j | | | | | | | | | 59.12 | |
| Curing agent k | | | | | | | | | | 61.18 |
| Methyl ethyl ketone (diluent) | 100 | 100 | 100 | 100 | 100 | 100 | 100 | 100 | 100 | 100 |
| Composition total (parts) | 364.17 | 340.66 | 361.91 | 371.63 | 264.78 | 279.34 | 283.9 | 283.12 | 259.12 | 261.18 |
| Curable resin mass (parts) | 223.13 | 198.46 | 196.13 | 220.14 | 164.78 | 179.34 | 183.90 | 183.12 | 159.12 | 161.18 |
| Glycerol residue (=$C_3H_5O_3$) content in curable resin % | 5.98 | 6.71 | 6.24 | 6.05 | 8.08 | 7.43 | 7.24 | 7.27 | 8.37 | 8.26 |

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Water vapor permeability at amount of cured film of polyester resin of 5 g/m² 40° C. 90% (g/m² · day) | 24 | 36 | 45 | 60 | 39 | 36 | 34 | 37 | 45 | 38 |
| Oxygen permeability at amount of cured film of polyester resin of 5 g/m² 23° C. 0% (cc/m² · day · atm) | 15 | 22 | 35 | 41 | 10 | 41 | 42 | 34 | 69 | 54 |
| Oxygen permeability at amount of cured film of polyester resin of 5 g/m² 23° C. 90% (cc/m² · day · atm) | 9 | 13 | 23 | 32 | 6 | 36 | 39 | 29 | 43 | 40 |
| Laminate strength [N/15 mm] PET/cured resin composition/CPP | 2.5 | 4 | F (5.6) | F (6.8) | 1.9 | F (6.0) | F (6.6) | F (6.2) | F (6.8) | F (6.0) |
| Laminate strength [N/15 mm] Ny/cured resin composition/LLDPE | 2 | 4.6 | 4.9 | F (7.4) | 2.3 | F (7.4) | F (7.9) | F (7.6) | F (7.9) | F (7.7) |

TABLE 4

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Water vapor permeability at amount of cured film of polyester | 49 | 52 | 41 | 56 | 52 | 48 | 45 | 50 | 37 | 44 |

TABLE 4-continued

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| resin of 5 g/m² 40° C. 90% (g/m² · day) | | | | | | | | | | |
| Oxygen permeability at amount of cured film of polyester resin of 5 g/m² 23° C. 0% (cc/m² · day · atm) | 31 | 35 | 25 | 68 | 63 | 39 | 36 | 59 | 33 | 48 |
| Oxygen permeability at amount of cured film of polyester resin of 5 g/m² 23° C. 90% (cc/m² · day · atm) | 20 | 23 | 16 | 49 | 45 | 33 | 28 | 46 | 24 | 41 |
| Laminate strength [N/15 mm] PET/cured resin composition/CPP | F (6.2) | F (6.2) | F (6.0) | F (6.8) | F (6.6) | F (6.8) | F (6.6) | F (6.8) | F (6.6) | F (6.0) |
| Laminate strength [N/15 mm] Ny/cured resin composition/LLDPE | F (7.9) | F (7.7) | F (7.9) | F (7.9) | F (7.7) | F (7.9) | F (7.9) | F (7.9) | F (7.4) | F (7.6) |

TABLE 5

|  | Comparative example 1 | Comparative example 2 | Comparative example 3 | Comparative example 4 | Reference value |
|---|---|---|---|---|---|
| TMP (oPAEG) 3 | 100 | | | | — |
| TMP (oPAEG) 6 | | 100 | | | — |
| EGoPA 600 | | | 100 | | — |
| GLY (iPAEG) 3 | | | | 100 | — |
| Curing agent a | 63.15 | 34.87 | 49.87 | 67.17 | — |
| Methylethyl ketone (diluent) | 100 | 100 | 100 | 100 | — |
| Composition total (parts) | 263.15 | 234.87 | 249.87 | 267.17 | — |
| curable resin mass (parts) | 155.26 | 130.51 | 143.64 | 158.78 | — |
| Glycerol residue (=C₃H₅O₃) content in curable resin % | 0 | 0 | 0 | 8.39 | 0 |

TABLE 6

|  | Comparative example 1 | Comparative example 2 | Comparative example 3 | Comparative example 4 | Reference value |
|---|---|---|---|---|---|
| Water vapor permeability at amount of cured film of polyester resin of 5 g/m² 40° C. 90% (g/m² · day) | 153 | 186 | 190 | * | 110* |
| Oxygen permeability at amount of cured film of polyester resin of 5 g/m² 23° C. 0% (cc/m² · day · atm) | 58 | 73 | 108 | * | 312* |
| Oxygen permeability at amount of cured film of polyester resin of 5 g/m² 23° C. 90% (cc/m² · day · atm) | 71 | 65 | 45 | * | 240 |
| Laminate strength [N/15 mm] PET/cured resin composition/CPP | 3 | F (5.7) | F (6.0) | * | — |

TABLE 6-continued

| | Comparative example 1 | Comparative example 2 | Comparative example 3 | Comparative example 4 | Reference value |
|---|---|---|---|---|---|
| Laminate strength [N/15 mm] Ny/cured resin composition/LLDPE | 2 | F (7.4) | F (7.9) | * | — |

*Not dissolved into methyl ethyl ketone and ethyl acetate

As a result, the water vapor permeabilities of all resin layers with 5 g/m² thickness produced by curing the resin compositions in examples 1 to 20 were 60 g/m²·day or less and were considerably lower than 110 g/m²·day of the 12-μm orientation PET film.

Also, the oxygen permeabilities (23° C. 0% RH) of all resin layers with 5 g/m² thickness produced by curing the resin compositions in examples 1 to 20 were 70 cc/m²·day·atm or less and the oxygen permeabilities (23° C. 90% RH) were 50 cc/m²·day·atm or less. Therefore, the oxygen permeability was considerably lower than 240 g/m²·day·atm of the 12-μm orientation PET film.

In the case where the resins produced by curing the resin composition in the examples 1 to 20 were used as dry-lamination adhesive to bond the PET film and the CPP film or the nylon (Ny) film and the LLDPE film, adhesion performance was exhibited. In particular, the resin adhesives produced by curing the resin compositions in examples 6 to 20 exhibited very good adhesion to cause film breakage.

On the other hand, the comparative examples 1 to 3 did not contain glycerol and, therefore, the water vapor permeability was 153 to 190 g/m²·day. Furthermore, in comparative example 4, the phthalic acid of the polyester resin was changed to isophthalic acid and, thereby, solubility into the solvent was degraded, so that it was not possible to apply to the film.

Next, the embodiments in the case where the layered inorganic compound was contained are described.

The layered inorganic compounds used in each embodiment are described below as Layered inorganic compounds A to E.

(Layered Inorganic Compound A)

BARRISURF HX (produced by IMERYS, kaoline/no water-swelling property, nonionic interlayer property, tabular, average particle diameter/1.5 μm, aspect ratio/about 50)

(Layered Inorganic Compound B)

MMICRO ACE K-1 (produced by NIPPON TALC Co., Ltd., talc/no water-swelling property, nonionic interlayer property, tabular, average particle diameter 8 μm, aspect ratio/about 20)

(Layered Inorganic Compound C)

PDM-10BY (produced by Topy Industries, Limited, synthetic mica/no water-swelling property, nonionic interlayer property, tabular, average particle diameter 12.8 μm, aspect ratio/about 70)

(Layered Inorganic Compound D)

HM6025 (produced by HENGHAO, natural mica/no water-swelling property, nonionic interlayer property, tabular, average particle diameter 10 μm, aspect ratio 100 or more)

(Layered Inorganic Compound E)

STABIACE HT-7 (produced by Sakai Chemical Industry Co., Ltd., hydrotalcite/anionic interlayer property, tabular, average particle diameter/0.6 μm, aspect ratio/about 25)

An inorganic compound, which is not-layered inorganic compound F, used in the comparative example 4 is described below.

(Not-Layered Inorganic Compound F)

5 (produced by Sakai Chemical Industry Co., Ltd., zinc oxide fine particle, spherical, average particle diameter 5 μm, aspect ratio is estimated as about 1 because the shape is not a plate)

(Method for Dispersing Inorganic Compound; Examples 21 to 31, Comparative Example 8)

A container provided with an agitator was charged with the polyester polyol resin produced in the above-described Production example, heating and agitation were performed at 90° C., the polyester polyol was brought into the state in which sufficient fluidity was maintained. Layered inorganic compounds A to E or Not-layered inorganic compound F was added under agitation at the blend ratio shown in Table 7 and Table 11 below, and agitation was performed until homogeneity was ensured at 90° C. This was cooled, so that a dispersion in which the inorganic compound was dispersed in the polyester polyol was obtained.

(Manufacturing Method for Polyester Polyol Resin Coating Solution in Examples 21 to 31 and Comparative Example 8)

The polyester polyol/inorganic compound dispersion solution was obtained as the polyester polyol resin coating solution containing the inorganic compound by diluting the polyester polyol/inorganic compound dispersion in which the inorganic compound was dispersed by the above-described method. In addition, the curing agent was blended as shown in Table 7, so that the polyester polyol resin coating solution to be used by the coating method described later was obtained.

(Manufacturing Method for Polyester Polyol Resin Coating Solution in Reference Examples 1 to 11 and Comparative Examples 5 to 7)

As for the polyester polyol resin coating solution not containing the inorganic compound, the polyester polyol obtained by the above-described method was diluted with methyl ethyl ketone to obtain a resin solution having a non-volatile content of 50%, the curing agent was further bended as shown in Table 9 and Table 11, so that the polyester polyol resin coating solution to be used by the coating method described later was obtained.

(Coating Method)

The polyester polyol resin coating solution was applied by using a bar coater to a PET film ("E-5100" produced by Toyobo Co., Ltd.) having a thickness of 12 μm in such a way that the amount of coating became 5.0 g/m² (solid content). The diluent solvent was volatilized and dried with a dryer set at a temperature of 70° C. Then, the resulting composite film and a nylon (Ny) film ("EMBLEM ON-BC" produced by UNITIKA LTD.) having a thickness of 15 μm were subjected to dry laminate at a temperature of 40° C., a pressure of 0.4 MPa, and a laminate speed 40 m/min, the resulting composite film was cured at 40° C. for 3 days, so that PET/polyester polyol resin composition/Ny laminate was obtained.

(Method for Measuring Laminate Strength)

The laminate film subjected to the aging was cut parallel to the coating direction into the width of 15 mm. Tensilon universal tester produced by K.K. Orienteck was used, the atmosphere temperature was set at 25° C. and peeling speed was set at 3000 mm/min, and between the PET film and the CPP film and between the Ny film and the LLDPE film were peeled by the 180° peeling method, and the tensile strength was specified to be the lamination strength. The unit of the laminate strength was specified to be N/15 mm.

The blends in the above-described examples are shown in Table 7, the evaluation results are shown in Table 8, the blends in the reference examples are shown in Table 9, the evaluation results are shown in Table 10, the blends in the comparative examples are shown in Table 11, and the evaluation results are shown in Table 12.

TABLE 7

|  | Example 21 | Example 22 | Example 23 | Example 24 | Example 25 | Example 26 | Example 27 | Example 28 | Example 29 | Example 30 | Example 31 |
|---|---|---|---|---|---|---|---|---|---|---|---|
| GLY (oPAEG) 1 | 100 | | | | | | | | | | |
| GLY (oPAEG) 3 | | 100 | | | | | | 100 | 100 | 100 | 100 | 100 |
| GLY (oPAEG) 6 | | | 100 | | | | | | | | |
| GLY (oNAEG) 2 | | | | 100 | | | | | | | |
| GLY3o PA7EG5 | | | | | 100 | | | | | | |
| GLYoHHPAEG | | | | | | 100 | | | | | |
| Curing agent a | 157.84 | 67.17 | 36.06 | 77.85 | | | | | | | |
| Curing agent b | | | | | 209.2 | 270.3 | 164.17 | | | | |
| Curing agent c | | | | | | | | 140.66 | | | |
| Curing agent e | | | | | | | | | 171.63 | | |
| Curing agent h | | | | | | | | | | 83.9 | |
| Curing agent j | | | | | | | | | | | 83.12 |
| Layered inorganic compound A | 18 | 50 | | | | | | | | | |
| Layered inorganic compound B | | | 25 | 50 | | | | | | | |
| Layered inorganic compound C | | | | | 20 | 60 | | | | | |
| Layered inorganic compound D | | | | | | | | 12 | 50 | 100 | |
| Layered inorganic compound E | | | | | | | | | | 80 | 50 |
| Methylethyl ketone (diluent) | 100 | 100 | 100 | 100 | 100 | 100 | 100 | 100 | 100 | 100 | 100 |
| Composition total (parts) | 375.84 | 317.17 | 261.06 | 327.85 | 429.2 | 530.3 | 376.17 | 390.66 | 471.63 | 363.9 | 333.12 |
| curable resin mass (parts) | 238.11 | 158.78 | 131.55 | 168.12 | 256.90 | 302.73 | 223.13 | 198.46 | 220.14 | 183.90 | 183.12 |
| Glycerol residue (=$C_3H_5O_3$) content in curable resin % | 13.16 | 8.39 | 5.44 | 8.94 | 6.94 | 9.33 | 5.98 | 6.71 | 6.05 | 7.24 | 7.27 |
| Content of inorganic compound contained in curable resin % | 7.0 | 23.9 | 16.0 | 22.9 | 7.2 | 16.5 | 5.1 | 24.3 | 30.4 | 43.5 | 21.4 |

TABLE 8

|  | Example 21 | Example 22 | Example 23 | Example 24 | Example 25 | Example 26 | Example 27 | Example 28 | Example 29 | Example 30 | Example 31 |
|---|---|---|---|---|---|---|---|---|---|---|---|
| Water vapor permeability at amount of cured film of polyester resin of 5 g/m² 40° C. 90% (g/m² · day) | 18 | 27 | 36 | 18 | 19 | 19 | 35 | 23 | 19 | 20 | 28 |
| Oxygen permeability at amount of cured film of polyester | 10 | 19 | 23 | 7 | 25 | 31 | 23 | 15 | 21 | 18 | 30 |

TABLE 8-continued

| | Example 21 | Example 22 | Example 23 | Example 24 | Example 25 | Example 26 | Example 27 | Example 28 | Example 29 | Example 30 | Example 31 |
|---|---|---|---|---|---|---|---|---|---|---|---|
| resin of 5 g/m² 23° C. 0% (cc/m² · day · atm) | | | | | | | | | | | |
| Oxygen permeability at amount of cured film of polyester resin of 5 g/m² 23° C. 90% (cc/m² · day · atm) | 7 | 12 | 18 | 4 | 22 | 21 | 15 | 10 | 15 | 15 | 25 |
| Laminate strength [N/15 mm] PET/cured resin composition/CPP | 4 | F (7.0) | F (6.8) | 2.3 | F (7.2) | F (7.5) | F (6.9) | F (6.6) | F (6.9) | F (6.6) | F (7.1) |
| Laminate strength [N/15 mm] Ny/cured resin composition/LLDPE | 3 | 5.5 | F (7.4) | 3.5 | F (8.2) | F (8.5) | F (8.9) | F (8.0) | F (8.1) | F (7.9) | F (8.3) |

TABLE 9

| | Reference example 1 | Reference example 2 | Reference example 3 | Reference example 4 | Reference example 5 | Reference example 6 | Reference example 7 | Reference example 8 | Reference example 9 | Reference example 10 | Reference example 11 |
|---|---|---|---|---|---|---|---|---|---|---|---|
| GLY (oPAEG) 1 | 100 | | | | | | | | | | |
| GLY (oPAEG) 3 | | 100 | | | | | 100 | 100 | 100 | 100 | 100 |
| GLY (oPAEG) 6 | | | 100 | | | | | | | | |
| GLY (oNAEG) 2 | | | | 100 | | | | | | | |
| GLY3o PA7EG5 | | | | | 100 | | | | | | |
| GLYoHHPAEG | | | | | | 100 | | | | | |
| Curing agent a | 157.84 | 67.17 | 36.06 | 77.85 | | | | | | | |
| Curing agent b | | | | | 209.2 | 270.3 | 164.17 | | | | |
| Curing agent c | | | | | | | | 140.66 | | | |
| Curing agent e | | | | | | | | | 171.63 | | |
| Curing agent h | | | | | | | | | | 83.9 | |
| Curing agent j | | | | | | | | | | | 83.12 |
| Methylethyl ketone (diluent) | 100 | 100 | 100 | 100 | 100 | 100 | 100 | 100 | 100 | 100 | 100 |
| Composition total (parts) | 357.84 | 267.17 | 236.06 | 277.85 | 409.2 | 470.3 | 364.17 | 340.66 | 371.63 | 283.9 | 283.12 |
| curable resin mass (parts) | 238.11 | 158.78 | 131.55 | 168.12 | 256.90 | 302.73 | 223.13 | 198.46 | 220.14 | 183.90 | 183.12 |
| Glycerol residue (=C₃H₅O₃) content in curable resin % | 13.16 | 8.39 | 5.44 | 8.94 | 6.94 | 9.33 | 5.98 | 6.71 | 6.05 | 7.24 | 7.27 |

TABLE 10

| | Reference example 1 | Reference example 2 | Reference example 3 | Reference example 4 | Reference example 5 | Reference example 6 | Reference example 7 | Reference example 8 | Reference example 9 | Reference example 10 | Reference example 11 |
|---|---|---|---|---|---|---|---|---|---|---|---|
| Water vapor permeability at amount of cured film of polyester resin of 5 g/m² 40° C. 90% (g/m² · day) | 24 | 45 | 60 | 39 | 34 | 45 | 49 | 52 | 56 | 45 | 50 |
| Oxygen permeability at amount of cured film of polyester resin of 5 g/m² 23° C. 0% (cc/m² · day · atm) | 15 | 35 | 41 | 10 | 42 | 69 | 31 | 35 | 68 | 36 | 59 |

TABLE 10-continued

|  | Reference example 1 | Reference example 2 | Reference example 3 | Reference example 4 | Reference example 5 | Reference example 6 | Reference example 7 | Reference example 8 | Reference example 9 | Reference example 10 | Reference example 11 |
|---|---|---|---|---|---|---|---|---|---|---|---|
| Oxygen permeability at amount of cured film of polyester resin of 5 g/m² 23° C. 90% (cc/m² · day · atm) | 9 | 23 | 32 | 6 | 39 | 43 | 20 | 23 | 49 | 28 | 46 |
| Laminate strength [N/15 mm] PET/cured resin composition/CPP | 2.5 | F (5.6) | F (6.8) | 1.9 | F (6.6) | F (6.8) | F (6.2) | F (6.2) | F (6.8) | F (6.6) | F (6.8) |
| Laminate strength [N/15 mm] Ny/cured resin composition/LLDPE | 2 | 4.9 | F (7.4) | 2.3 | F (7.9) | F (7.9) | F (7.9) | F (7.7) | F (7.9) | F (7.9) | F (7.9) |

TABLE 11

|  | Comparative example 5 | Comparative example 6 | Comparative example 7 | Comparative example 8 |
|---|---|---|---|---|
| TMP (oPAEG) 3 | 100 | | | |
| EGoPA 600 | | 100 | | |
| GLY (iPAEG) 3 | | | 100 | |
| GLY (oPAEG) 3 | | | | 100 |
| Curing agent a | 63.15 | 49.87 | 67.17 | 67.17 |
| Not layered inorganic compound F | | | | 50 |
| Methylethyl ketone (diluent) | 100 | 100 | 100 | 100 |
| Composition total (parts) | 263.15 | 249.87 | 267.17 | 267.17 |
| curable resin mass (parts) | 155.26 | 143.64 | 158.78 | 158.78 |
| Glycerol residue (=$C_3H_5O_3$) content in curable resin % | 0 | 0 | 8.39 | 8.39 |
| Content of inorganic compound contained in curable resin % | 0 | 0 | 0 | 23.9 |

TABLE 12

|  | Comparative example 5 | Comparative example 6 | Comparative example 7 | Comparative example 8 |
|---|---|---|---|---|
| Water vapor permeability at amount of cured film of polyester resin of 5 g/m² 40° C. 90% (g/m² · day) | 153 | 190 | impossible | 51 |
| Oxygen permeability at amount of cured film of polyester resin of 5 g/m² 23° C. 0% (cc/m² · day · atm) | 58 | 108 | impossible | 35 |
| Oxygen permeability at amount of cured film of polyester resin of 5 g/m² 23° C. 90% (cc/m² · day · atm) | 71 | 45 | impossible | 25 |
| Laminate strength [N/15 mm] PET/cured resin composition/CPP | 3 | F (6.0) | impossible | 1.5 |
| Laminate strength [N/15 mm] Ny/cured resin composition/LLDPE | 2 | F (7.9) | impossible | 1.2 |

As a result, the water vapor permeabilities of all polyester polyol resin compositions containing 5 to 44 percent by mass of layered inorganic compound in Examples 21 to 31 and including glycerin skeleton were 36 g/m²·day or less where the adhesive layer thickness corresponded to 5 g/m² of coating amount and were considerably lower than 110 g/m²·day of the 12-μm orientation PET film, so that good water vapor barrier function was exhibited.

Also, in the same examples, all the oxygen permeabilities (23° C. 0% RH) were 25 cc/m²·day·atm or less and all the oxygen permeabilities (23° C. 90% RH) were 25 cc/m²·day·atm or less. Therefore, the oxygen permeability was considerably lower than 240 g/m²·day·atm of the 12-μm orientation PET film, so that excellent oxygen barrier function was exhibited. In addition, the resins produced by curing the resin composition in the examples 21 to 31 were used as dry-lamination adhesive to bond the PET film and the CPP film or the nylon (Ny) film and the LLDPE film, and good lamination performance was exhibited.

These water vapor permeability, the oxygen permeability, and the adhesion performance were excellent as compound with those of the polyester polyol resin composition which has the same resin composition but do not contain the layered inorganic compound.

On the other hand, the comparative examples 5 and 6 did not contain glycerol and, therefore, the water vapor permeability was 153 to 190 g/m²·day. Furthermore, in comparative example 7, the phthalic acid of the polyester polyol resin was changed to isophthalic acid and, thereby, solubility into the solvent was degraded, so that it was not possible to apply to the film and evaluation was impossible. In addition, as for the comparative example 8 in which not-layered inorganic compound was added, the water vapor permeability and the oxygen permeability is not reduced (that is, improvement of barrier) and the lamination strength was reduced to less than half of that before addition of the inorganic compound.

INDUSTRIAL APPLICABILITY

The resin composition for a barrier material has the gas or water vapor barrier property and, therefore, can be favorably used for applications required to have the above-described barrier property, for example, the above-described adhesives for laminate and primers for film laminate for packaging materials and others, such as adhesives for solar cell protection films, coating materials, adhesives, and sealing agents for electronic materials, for example, coating agents for water barrier substrate for display elements, coating materials and adhesives for construction materials, and coating materials, adhesives, and sealing materials for industrial materials.

The invention claimed is:

1. A polyester resin composition comprising:
a polyester polyol represented by General formula (1), the polyester polyol being prepared from a glycerol, an orthophthalic acid or anhydride thereof and ethylene glycol; and
a curing agent,

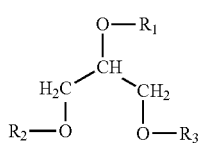

(1)

wherein in the formula (1), $R_1$ to $R_3$ independently represent a hydrogen atom or a group represented by General formula (2)

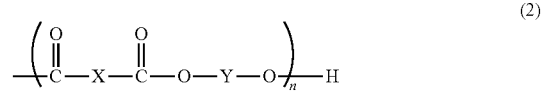

(2)

wherein in the formula (2), n represents an integer of 1 to 5, X represents an arylene group selected from the group consisting of 1,2-phenylene group, 1,2-naphthylene group, 2,3-naphthylene group, 2,3-anthraquinonediyl group, and 2,3-anthracenediyl group, which may have a substituent, or a group produced by a hydrogenation reaction of an arylene group selected from the group consisting of 1,2-phenylene group, 1,2-naphthylene group, 2,3-naphthylene group, 2,3-anthraquinonediyl group, and 2,3-anthracenediyl group, which may have a substituent, and Y represents an alkylene group having the carbon number of 2 to 6, where at least one of $R_1$ to $R_3$ is a group represented by General formula (2),
wherein 5.98 percent by mass or more of glycerol residue of the polyester polyol represented by General formula (1) is contained in the polyester resin composition,
wherein a water vapor permeability of a resin layer having a thickness of 5 g/m² produced by curing the resin compositions is less than 60 g/m²·day.

2. The polyester resin composition according to claim 1, wherein the curing agent is an isocyanate compound.

3. The polyester resin composition according to claim 2, wherein the isocyanate compound is toluene diisocyanate, xylene diisocyanate, diphenylmethane diisocyanate, polymethylene polyphenyl polyisocyanate, a reaction product of toluene diisocyanate or xylene diisocyanate and a polyhydric alcohol having at least two hydroxyl groups in the molecule, or an isocyanate compound produced by a hydrogenation reaction of toluene diisocyanate, xylene diisocyanate, diphenylmethane diisocyanate, or polymethylene polyphenyl polyisocyanate.

4. A polyester resin composition according to claim 1, wherein the polyester resin composition is used as a barrier material.

5. The polyester resin composition according to claim 4, wherein the barrier material is a gas barrier material.

6. The polyester resin composition according to claim 4, wherein the barrier material is an oxygen barrier material or a water vapor barrier material.

7. The polyester resin composition according to claim 1, further comprising a layered inorganic compound.

8. The polyester resin composition according to claim 7, wherein the layered inorganic compound does not have a water-swelling property.

9. The polyester resin composition according to claim 7, wherein the layered inorganic compound contains particles having an average particle diameter of 0.1 μm or more.

10. The polyester resin composition according to claim 7, wherein a content of the layered inorganic compound is 5 to 50 parts by mass, where the total mass of the polyester polyol, the curing agent, and the layered inorganic compound is specified to be 100 parts by mass.

11. A coating agent produced by curing the polyester resin composition according to claim 1.

12. An adhesive produced by curing the polyester resin composition according to claim 1.

13. A film comprising a resin layer produced by curing the polyester resin composition according to claim 1.

14. The polyester resin composition according to claim 1, wherein 5.98 to 13.16 percent by mass of glycerol residue of the polyester polyol represented by General formula (1) is contained in the polyester resin composition.

15. The polyester resin composition according to claim 1, wherein the water vapor permeability of the resin layer having the thickness of 5 g/m$^2$ produced by curing the resin compositions is 56 g/m$^2$·day or less.

16. The polyester resin composition according to claim 1, wherein the water vapor permeability of the resin layer having the thickness of 5 g/m$^2$ produced by curing the resin compositions is between 24 g/m$^2$·day and 56 g/m$^2$·day.

* * * * *